May 2, 1961

E. B. JOHNSON 2,982,298

AUTOMATIC WATER SUPPLY CONTROL

Filed Jan. 6, 1959

INVENTOR.
EARL B. JOHNSON
BY
*Philip D. McBean*
ATTORNEY

2,982,298
AUTOMATIC WATER SUPPLY CONTROL

Earl B. Johnson, R.D. 4, Box 252, Freehold, N.J.

Filed Jan. 6, 1959, Ser. No. 785,201

3 Claims. (Cl. 137—421)

The invention herein disclosed relates to control of the supply of water to various water consuming or disposal utilities, such as watering troughs, poultry fountains, flush tanks and the like.

Objects of the invention are to provide means for controlling admission of water to a tank or other holder to restore or replenish the supply as it is removed or disposed of, which will be of simple low-cost construction, consist of but few sturdy parts not likely to get out of order and which can be relied on to continue in operation indefinitely unattended and without requiring servicing or other attention.

These and other desirable objects have been accomplished in the present invention through a novel form of float structure arranged by its rising and falling action to control the flow from a supply source.

Other important objects accomplished and further novel features of construction, combinations and relations of parts are set forth and will appear in the course of the following specification.

The drawing accompanying and forming part of the specification illustrates a practical embodiment of the invention but it will be appreciated that structure may be modified and changed in regard to such illustration, all within the true intent and scope of the invention as hereinafter defined and claimed.

In the form of the invention illustrated there is a valve closing lever, here designated 80 which is weighted at 81 and is lifted by a trip lever 82 through a toggle 83 and is tripped by the float 84, which, as it rises, operates to "break" the toggle to permit the lever to lower and close the inlet valve.

Figure 1:
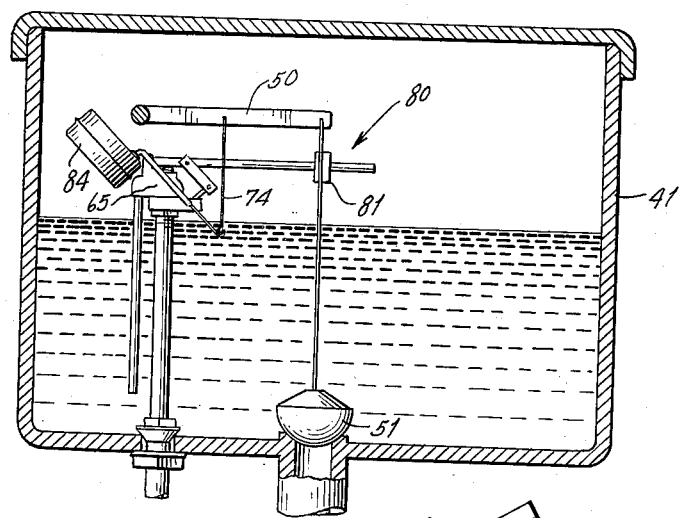
Figs. 1, 2 and 3 are broken sectional views of a form of flush tank mechanism in which the inlet valve is closed by the lowering of a weighted lever arm and the float operates to trip a toggle to drop the lever arm to the lower, valve closed position.

Fig. 1 shows the normal position of parts with tank full and the lever arm 80 lowered and holding the inlet valve closed. The weight 81 can be adjusted on this arm according to pressure of the water supply system.

In the tank full position, Fig. 1, the float 84 is up, clear or substantially clear of water in the tank, permitted by the lowered or broken condition of the toggle.

Figure 2:
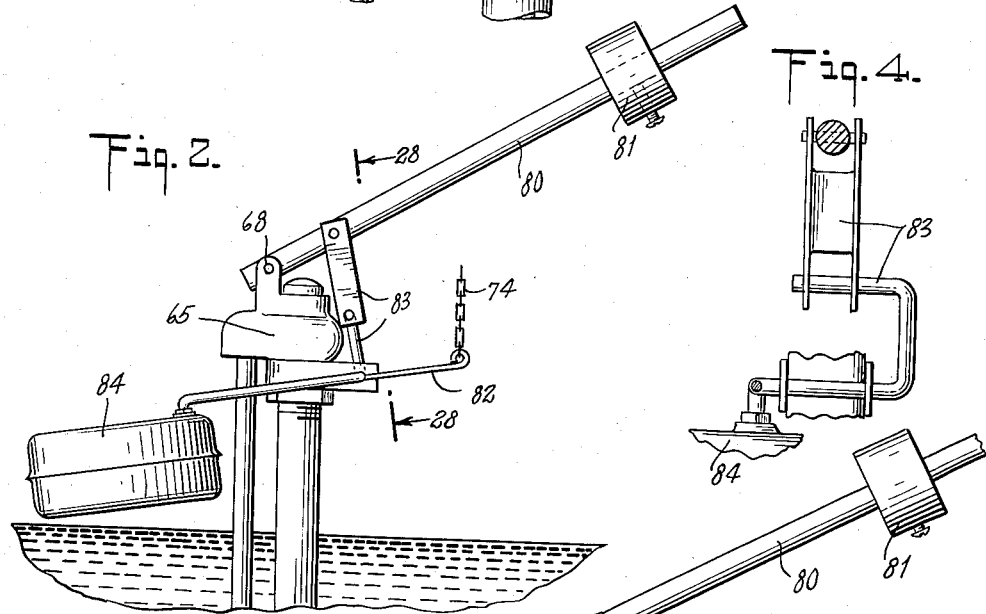
Figure 4:
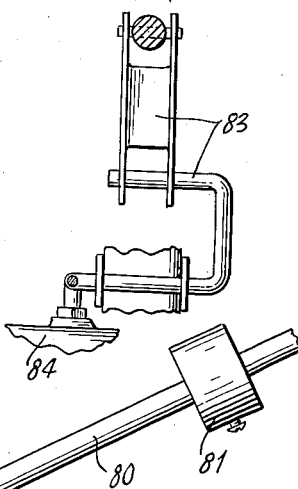
Fig. 4 is an enlarged broken sectional detail on substantially the plane of line 28—28 of Fig. 2.

Fig. 2 shows the tripped condition in which the valve controlling lever arm is raised to open the inlet valve and the toggle is "straightened" to hold this arm elevated, with the valve open and the float lowered.

Figure 3:
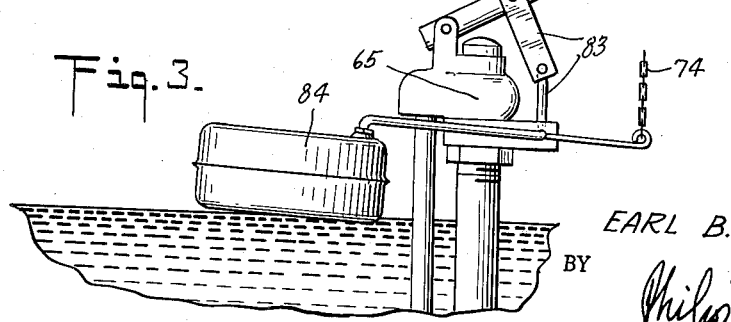

Fig. 3 shows the tank filling, with water reaching the float and lifting it sufficiently to "break" the toggle and permit it to drop the valve controlling lever arm to shut off further supply.

In this construction, downward movement of a lever is utilized to close off water supply and operation of a float is used to govern the action.

The float and other portions of the apparatus may be made of metal, plastic or other materials. If of plastic or other light materials, these may be weighted to operate properly.

Special advantages of the invention are that liquid is maintained at a constant level. The inlet valve is fully opened to quickly admit supply of liquid and remains fully opened during the filling operation so as not to restrict or retard replenishment of the supply. Also, it is of advantage in the case of a small leak at the ball valve in the flush tank forms of the invention, such leak will not start in-flow of liquid. Thus a slow leak will not keep a continuing in-flow or permit overflowing of the tank.

In all forms of the invention the inlet valve is controlled by a lever which lowers to close the valve. In the illustrated form the toggle gives the float the necessary leverage to lift the weighted valve closing arm.

The inlet valve 65 differs from the usual in that the valve action is reversed, the valve being closed when the upwardly projecting stem of the same is lowered by the weighted lever 80, Fig. 1 and open when the stem is up as in Fig. 2.

What is claimed is:

1. Automatic water supply control comprising the combination of inlet valve means and pivoted weighted lever and float mechanism connected and arranged to close said valve means on lowering movement of said pivoted lever, said lever being pivoted for vertical movement at one end and weighted at the opposite end sufficiently to hold the valve closed, means for holding said weighted lever in an uplifted valve open position and said float mechanism being connected to render said means ineffective to hold the weight of the lever in said upraised position.

2. Automatic water supply control comprising the combination of an inlet valve, a valve closing lever pivoted at one end and weighted at the opposite end sufficiently to hold the valve closed and arranged in its lowering movement to effect closure of said inlet valve, a toggle connected to lift said valve closing lever in movement of the toggle in one direction and to permit lowering of said valve closing lever in movement of the toggle in the opposite direction and a float connected with said toggle to impart movement to the toggle in said opposite direction in the upward movement of said float.

3. Automatic water supply control comprising the combination of an inlet valve, a pivoted valve closing lever arranged in lowering movement to close said inlet valve, a toggle connected in its straightening movement to raise and hold said lever uplifted in the inlet valve open position and in its breaking movement to effect lowering movement of said lever, a float connected in its raising movement to break said toggle and enable said lever to lower to the inlet valve closed position and means for straightening said toggle to raise said lever and effect opening movement of said inlet valve.

References Cited in the file of this patent

UNITED STATES PATENTS

| 1,812,774 | Collison | June 30, 1931 |
| 2,641,275 | Stambaugh | June 9, 1953 |
| 2,642,747 | Le Van | June 23, 1953 |